US012060845B1

(12) United States Patent
Palen et al.

(10) Patent No.: US 12,060,845 B1
(45) Date of Patent: Aug. 13, 2024

(54) PASSIVE EVALUATION OF EVENT DELAY ASSIGNMENT FOR INDIVIDUAL CYLINDER FUEL/AIR RATIO CONTROL

(71) Applicant: FCA US LLC, Auburn Hills, MI (US)

(72) Inventors: Jeffrey Palen, Washington, MI (US); Preetam Ramesh, Auburn Hills, MI (US); Kyle O Klanow, Troy, MI (US); David Blair, Clinton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/344,332

(22) Filed: Jun. 29, 2023

(51) Int. Cl.
*F02D 41/00* (2006.01)
*F02D 41/14* (2006.01)
*F02D 41/22* (2006.01)

(52) U.S. Cl.
CPC ..... *F02D 41/0085* (2013.01); *F02D 41/1454* (2013.01); *F02D 41/22* (2013.01); *F02D 2041/1431* (2013.01)

(58) Field of Classification Search
CPC ... F04D 41/0085; F04D 41/1454; F04D 41/22
See application file for complete search history.

(56) References Cited

U.S. PATENT DOCUMENTS 6,314,952 B1 * 11/2001 Turin .................. F02D 41/1401 123/674
6,382,198 B1 5/2002 Smith et al.
7,926,330 B2 4/2011 Huang et al.
9,874,167 B2 1/2018 MacEwen et al.
2004/0024519 A1 2/2004 Deibert et al.
2004/0112352 A1 6/2004 Dohta
2006/0235604 A1 10/2006 Taglialatela-Scafati et al.
2007/0175443 A1 8/2007 Schueler
2009/0241925 A1 10/2009 Behr et al.
2010/0070157 A1 3/2010 Forte et al.
2010/0082297 A1 4/2010 Turin et al.
2012/0255531 A1 10/2012 Kinose
2013/0060449 A1 3/2013 Bagnasco et al.
2013/0184969 A1 * 7/2013 Rollinger ............ F02D 41/2458 701/103

(Continued)

OTHER PUBLICATIONS

Smith, James C. et al., “Individual Cylinder Fuel Control for Imbalance Diagnosis”, SAE International, 2010-01-0157, Published Apr. 12, 2010. 7 pages.

*Primary Examiner* — John Kwon
(74) *Attorney, Agent, or Firm* — Jeremy J. Klobucar

(57) ABSTRACT

A fuel and emissions control method for an internal combustion engine of a vehicle includes performing passive evaluation of individual cylinder fuel control (ICFC) multipliers by determining whether any of the ICFC multipliers exceed an ICFC multiplier threshold and, in response, determining first and second cylinder fuel-air (FA) imbalances during first and second passive evaluation stages, respectively, separated by a passive evaluation delay period, and based on a comparison between the first and second cylinder FA imbalances, either (i) passing, by the controller, the evaluation and maintaining, by the controller, the ICFC multipliers or (ii) failing, by the controller, the evaluation and (a) resetting, by the controller, the ICFC multipliers and (b) increasing, by the controller, the passive evaluation delay period and repeating the passive evaluation.

20 Claims, 5 Drawing Sheets

(56) References Cited

U.S. PATENT DOCUMENTS

| | | | | |
|---|---|---|---|---|
| 2013/0268177 | A1* | 10/2013 | Wu | F02D 41/1458<br>73/114.72 |
| 2017/0122227 | A1* | 5/2017 | Rollinger | F02D 35/02 |
| 2019/0032585 | A1* | 1/2019 | Kelly | F01N 3/10 |
| 2019/0195736 | A1 | 6/2019 | Lee | |
| 2021/0047973 | A1* | 2/2021 | Martin | F02D 33/006 |

* cited by examiner

PASSIVE EVALUATION OF EVENT DELAY ASSIGNMENT FOR INDIVIDUAL CYLINDER FUEL/AIR RATIO CONTROL

FIELD

The present application generally relates to internal combustion engines and, more particularly, to techniques for passive evaluation of event delay assignment for individual cylinder fuel/air ratio control (ICFC).

BACKGROUND

An internal combustion engine combusts a mixture of fuel (gasoline, diesel, etc.) and air within a plurality of cylinders to generate drive torque. More specifically, an air charge is drawn into each cylinder and combined with an amount of fuel (e.g., via direct or port fuel injection) to form a fuel/air charge in each cylinder. The fuel/air charges are compressed by respective pistons within the cylinders and then ignited (e.g., by respective spark plugs). The combustion of the compressed fuel/air charges drives the pistons, which rotatably drive a crankshaft to generate drive torque. This drive torque could then be used for battery system recharging and/or for propulsion of a vehicle (e.g., after transfer to a driveline via a transmission). A ratio of fuel-to-air of each fuel/air charge greatly affects its combustion and resulting exhaust gas emissions. Adding dedicated sensors configured to monitor each cylinder's fuel/air ratio and its resulting exhaust gas composition would be extremely costly. Accordingly, while such conventional engine fuel control systems do work well for their intended purpose, there exists an opportunity for improvement in the relevant art.

SUMMARY

According to one example aspect of the invention, a fuel and emissions control system for an internal combustion engine of a vehicle is presented. In one exemplary implementation, the fuel and emissions control system comprises an upstream oxygen (O2) sensor arranged upstream or before an exhaust treatment system of the engine, the upstream O2 sensor being configured to generate an O2 signal indicative of a level of O2 in exhaust gas produced by combustion of fuel/air mixtures within each of a plurality of cylinders of the engine, and a controller configured to perform individual cylinder fuel control (ICFC) closed-loop control of the engine and a passive evaluation of ICFC multipliers including determining whether any of the ICFC multipliers exceed an ICFC multiplier threshold, in response to determining that an ICFC multiplier exceeds the multiplier threshold, determining first and second cylinder fuel-air (FA) imbalances during first and second passive evaluation stages, respectively, separated by a passive evaluation delay period, and based on a comparison between the first and second cylinder FA imbalances, either (i) passing the evaluation and maintaining the ICFC multipliers or (ii) failing the evaluation and (a) resetting the ICFC multipliers and (b) increasing the passive evaluation delay period and repeating the passive evaluation.

In some implementations, the controller is further configured to increase a deadband of the upstream O2 sensor and the O2 signal before calculating the first cylinder FA imbalance during the first passive evaluation stage. In some implementations, the controller is further configured to calculate the first cylinder FA imbalance as an average standard deviation of cylinder FA imbalances using the current ICFC multipliers. In some implementations, the controller is further configured to reset the deadband and reset the ICFC multipliers to one before calculating the second cylinder FA imbalance during the second passive evaluation stage.

In some implementations, the controller is further configured to calculate the second cylinder FA imbalance after the passive evaluation delay period as an average standard deviation of the cylinder FA imbalances using the reset ICFC multipliers. In some implementations, the controller is further configured to perform the comparison by determining whether the first cylinder FA imbalance is greater than or equal to the second cylinder FA imbalance. In some implementations, when the first cylinder FA cylinder imbalance is less than the second cylinder FA imbalance, the controller is configured to determine a pass evaluation and restore the ICFC multipliers to their previous values.

In some implementations, when the first cylinder FA imbalance is greater than or equal to the second cylinder FA imbalance, the controller is configured to determine a fail evaluation, reset the ICFC multipliers to one, increment the passive evaluation delay period, and repeat the passive evaluation of the ICFC multipliers. In some implementations, the ICFC multiplier threshold is approximately 1.05. In some implementations, the controller is configured to utilize ICFC across the full range of individual cylinder FA imbalances including steady-state emissions control.

According to another example aspect of the invention, a fuel and emissions control method for an internal combustion engine of a vehicle is presented. In one exemplary implementation, the fuel and emissions control method comprises providing an upstream O2 sensor arranged upstream or before an exhaust treatment system of the engine, the upstream O2 sensor being configured to generate an O2 signal indicative of a level of O2 in exhaust gas produced by combustion of fuel/air mixtures within each of a plurality of cylinders of the engine, providing a controller configured to perform ICFC closed-loop control of the engine, and performing, by the controller, passive evaluation of ICFC multipliers including determining, by the controller, whether any of the ICFC multipliers exceed an ICFC multiplier threshold, in response to determining that an ICFC multiplier exceeds the multiplier threshold, determining, by the controller, first and second cylinder FA imbalances during first and second passive evaluation stages, respectively, separated by a passive evaluation delay period, and based on a comparison between the first and second cylinder FA imbalances, either (i) passing, by the controller, the evaluation and maintaining, by the controller, the ICFC multipliers or (ii) failing, by the controller, the evaluation and (a) resetting, by the controller, the ICFC multipliers and (b) increasing, by the controller, the passive evaluation delay period and repeating the passive evaluation.

In some implementations, the method further comprises increasing, by the controller, a deadband of the upstream O2 sensor and the O2 signal before calculating, by the controller, the first cylinder FA imbalance during the first passive evaluation stage. In some implementations, the method further comprises calculating, by the controller, the first cylinder FA imbalance as an average standard deviation of cylinder FA imbalances using the current ICFC multipliers. In some implementations, the method further comprises resetting, by the controller, the deadband and reset the ICFC multipliers to one before calculating, by the controller, the second cylinder FA imbalance during the second passive evaluation stage.

In some implementations, the method further comprises calculating, by the controller, the second cylinder FA imbalance after the passive evaluation delay period as an average standard deviation of the cylinder FA imbalances using the reset ICFC multipliers. In some implementations, performing the comparison includes determining, by the controller, whether the first cylinder FA imbalance is greater than or equal to the second cylinder FA imbalance. In some implementations, the method further comprises when the first cylinder FA cylinder imbalance is less than the second cylinder FA imbalance, determining, by the controller, a pass evaluation and restoring, by the controller, the ICFC multipliers to their previous values.

In some implementations, the method further comprises when the first cylinder FA imbalance is greater than or equal to the second cylinder FA imbalance, determining, by the controller, a fail evaluation, resetting, by the controller, the ICFC multipliers to one, incrementing, by the controller, the passive evaluation delay, and repeating, by the controller, the passive evaluation of the ICFC multipliers. In some implementations, the ICFC multiplier threshold is approximately 1.05. In some implementations, the controller is configured to utilize ICFC across the full range of individual cylinder FA imbalances including steady-state emissions control.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
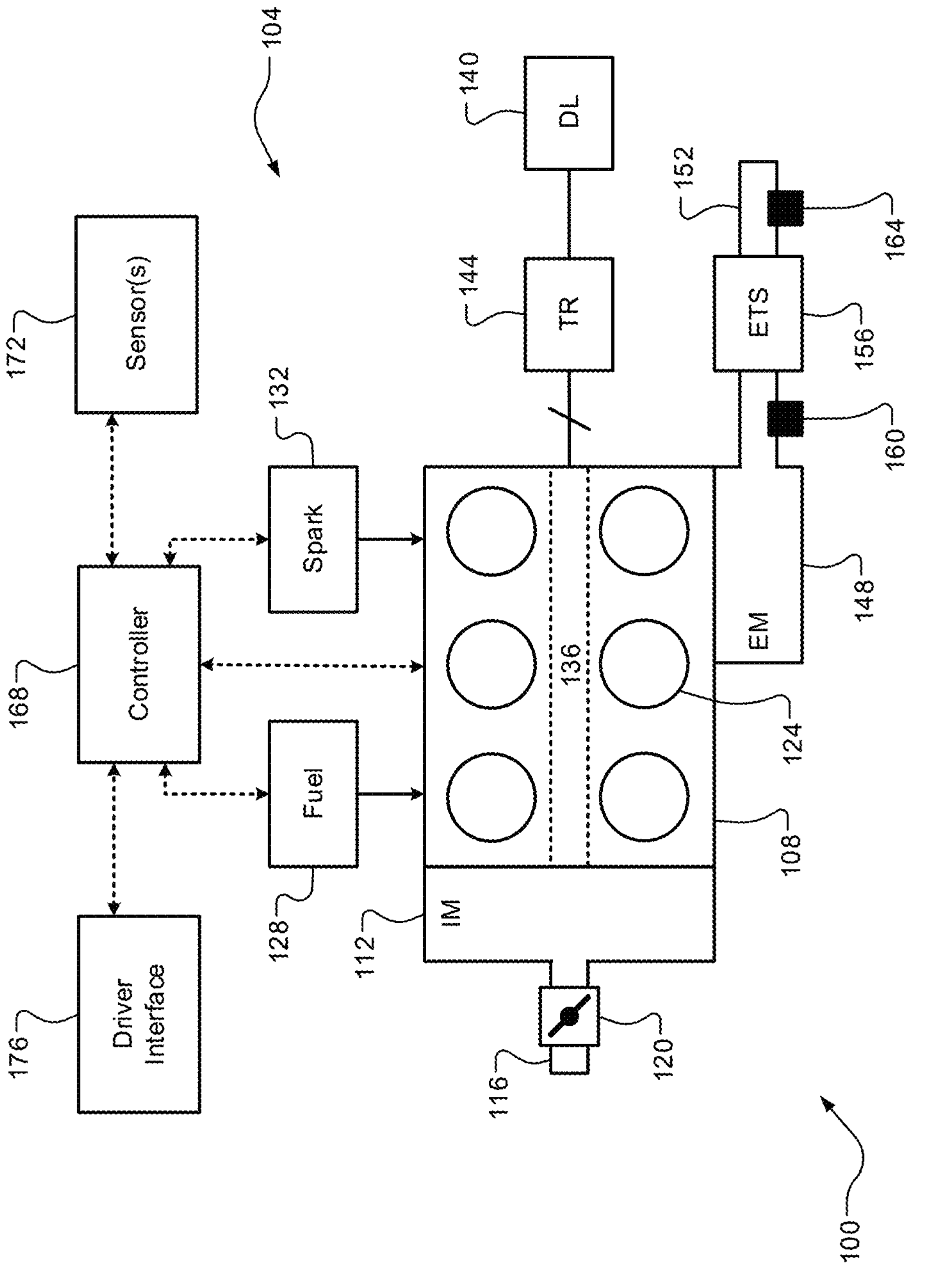
FIG. 1 is a functional block diagram of a vehicle having an internal combustion engine and an example fuel and emissions control system according to the principles of the present application.
Figure 2:
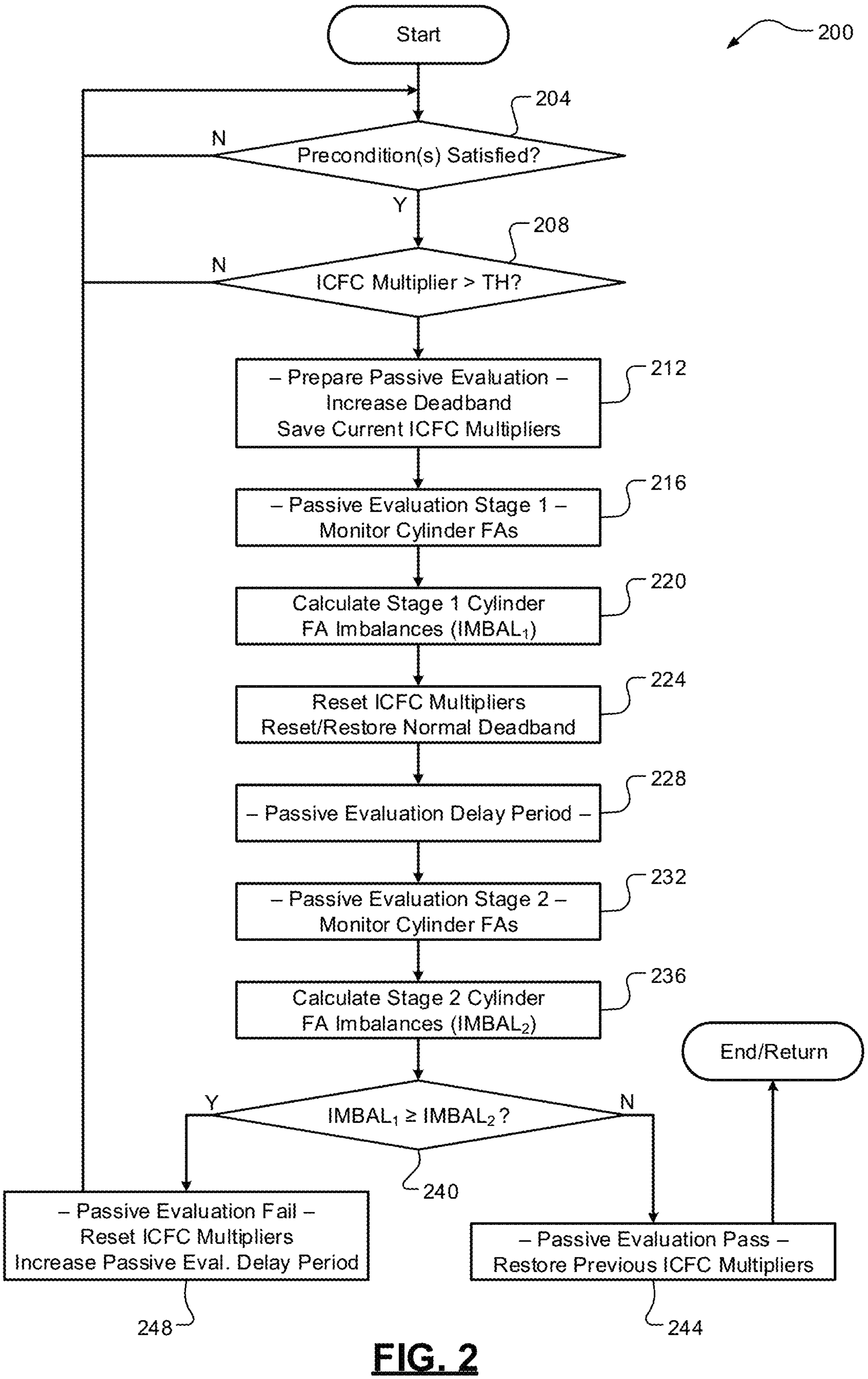
FIG. 2 is a flow diagram of an example fuel and emissions control system for an internal combustion engine of a vehicle according to the principles of the present application.
Figure 3A:
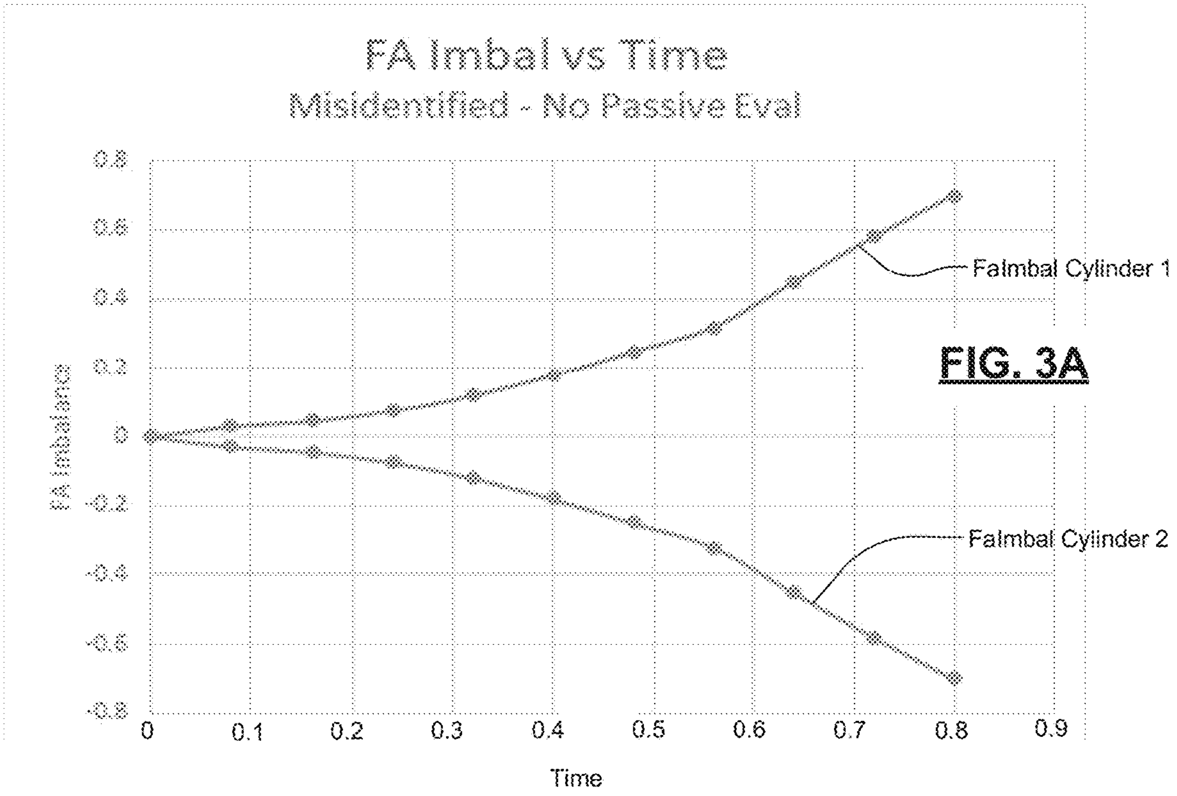
FIGS. 3A-3F are plots of example fuel-air (FA) imbalances and individual cylinder fuel control (ICFC) multipliers for passive evaluation failure and pass scenarios according to the principles of the present application.
Figure 3B:
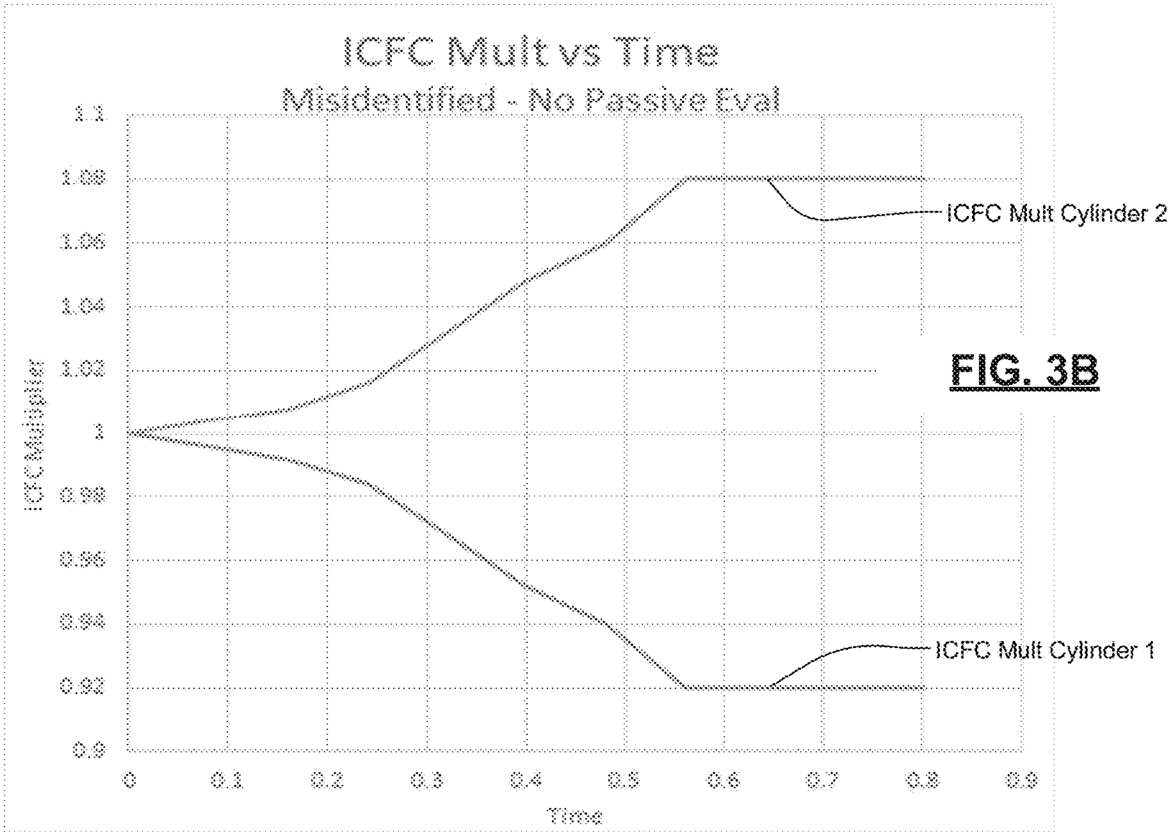
Figure 3C:
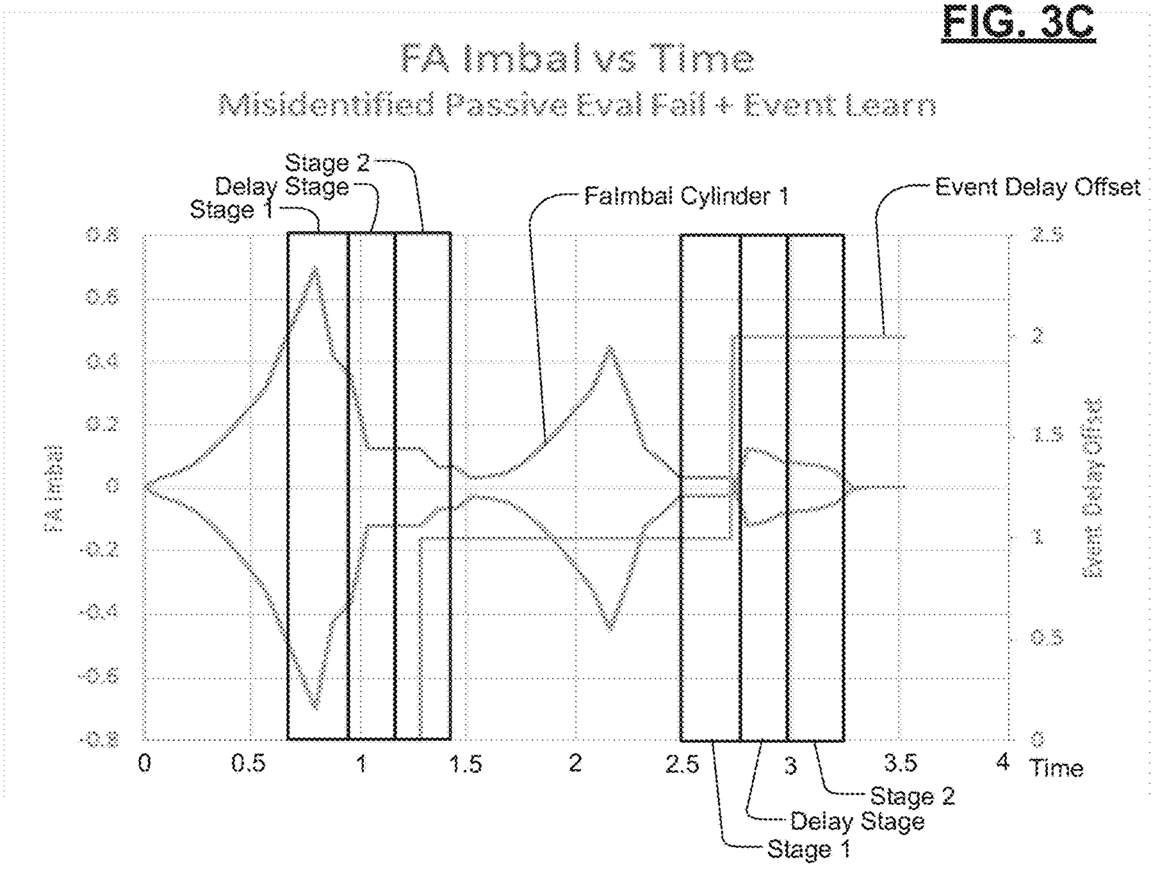
Figure 3D:
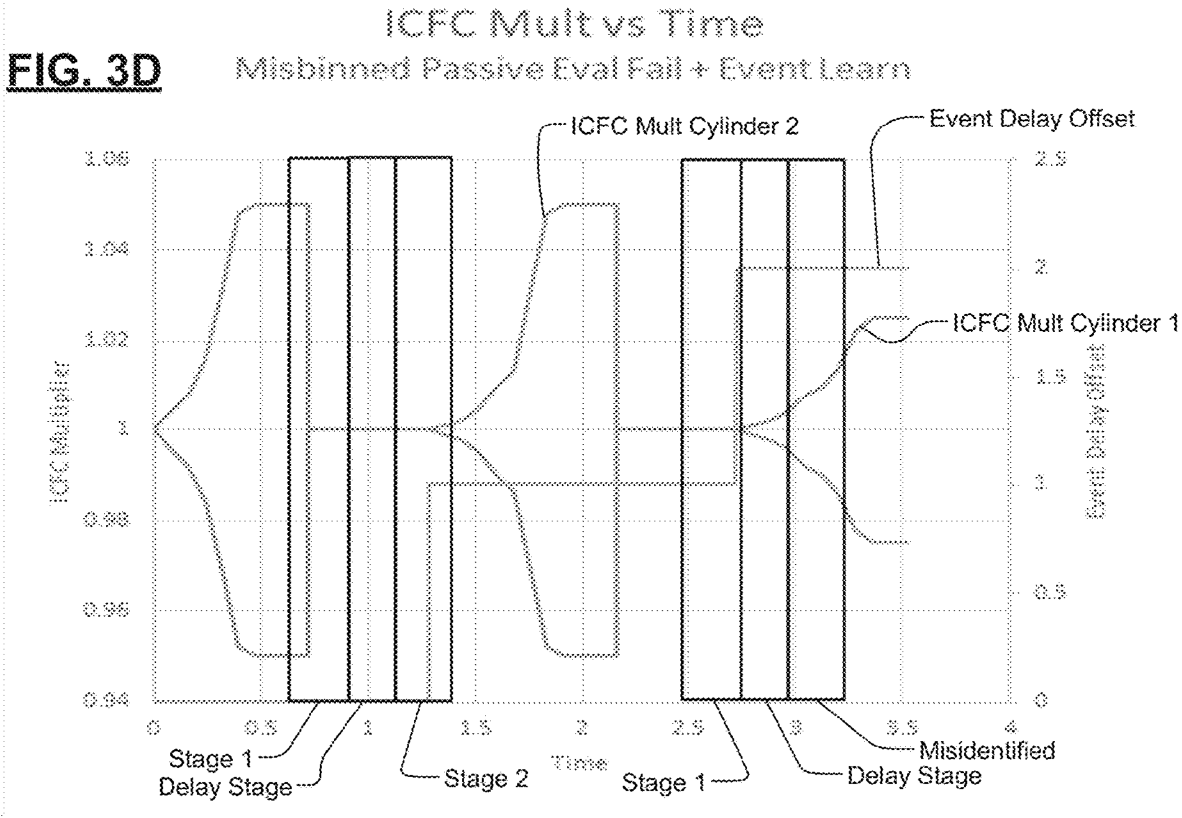
Figure 3E:
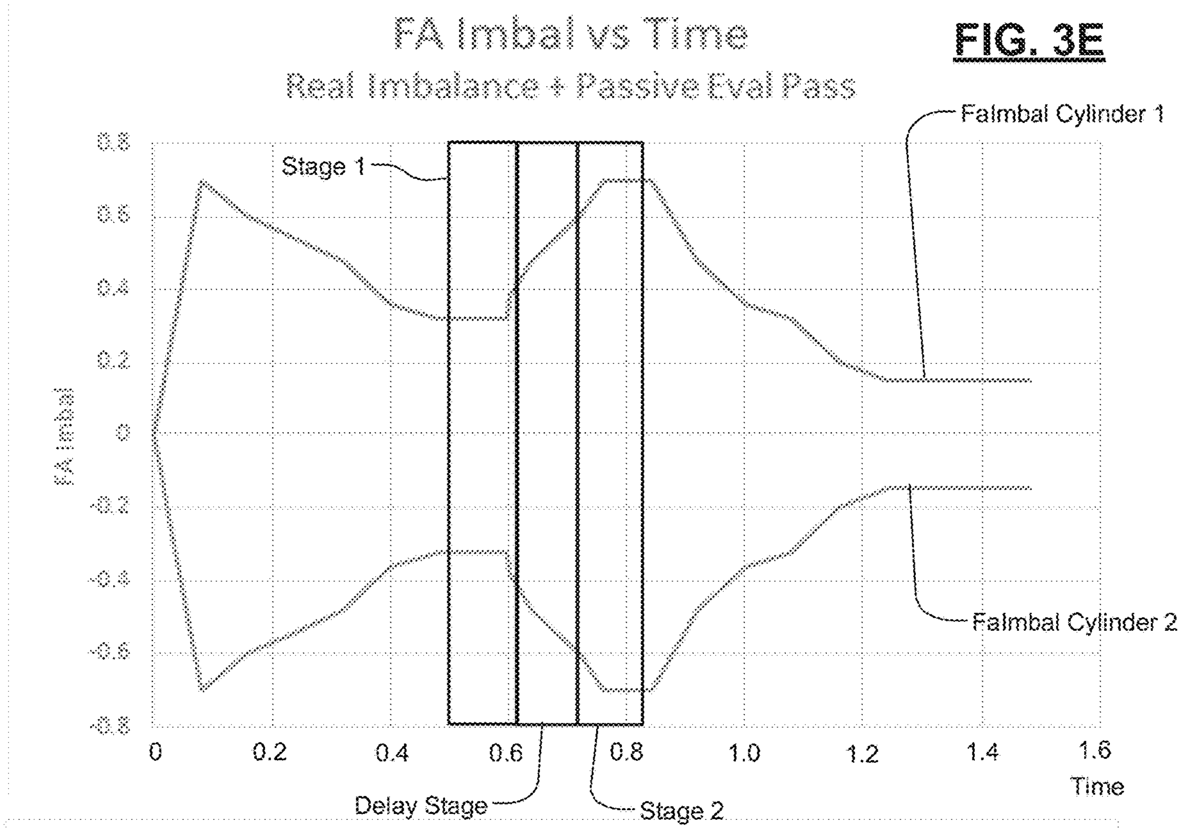
Figure 3F:
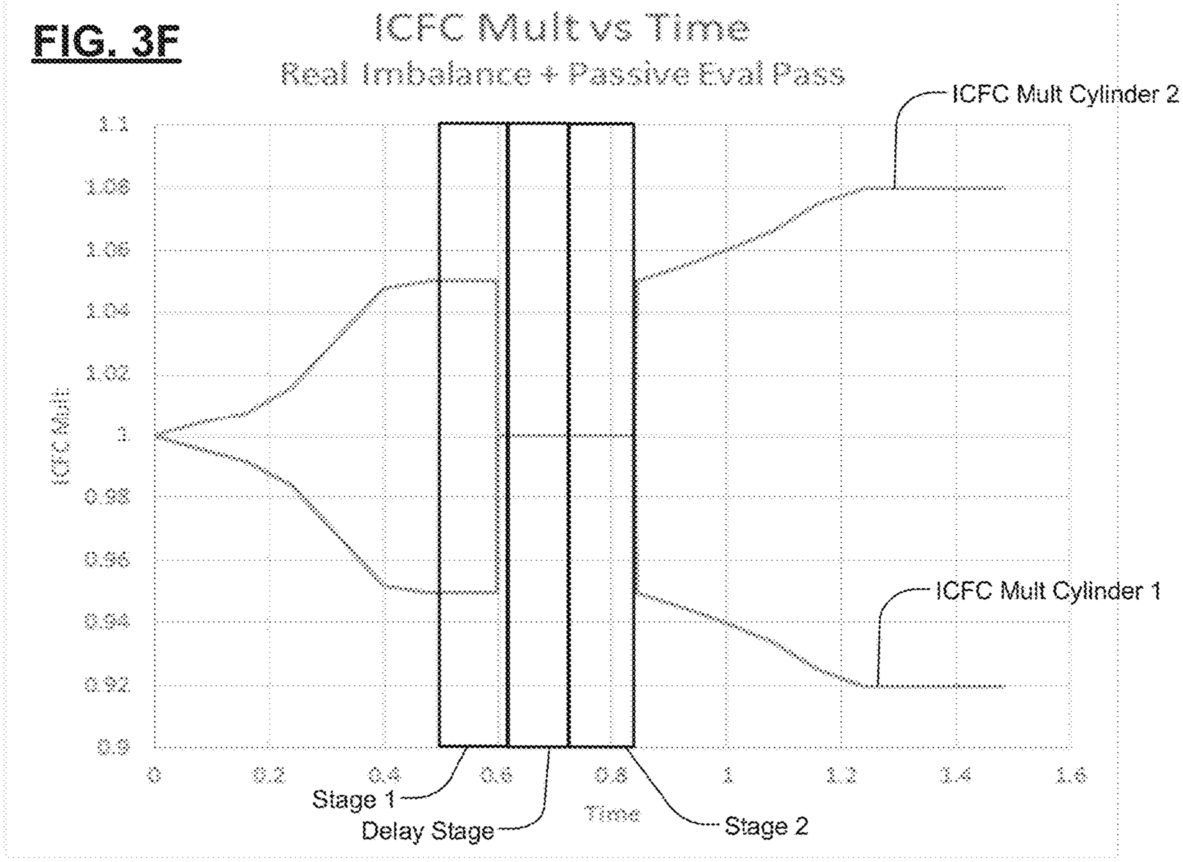

As previously discussed, a ratio of fuel-to-air of each fuel/air charge greatly affects its combustion and resulting exhaust gas emissions in an internal combustion engine. Adding dedicated sensors configured to monitor each cylinder's fuel/air ratio and its resulting exhaust gas composition would be extremely costly. Individual cylinder fuel control (ICFC) is a control technique that monitors an upstream (i.e., pre-catalyst) oxygen (O2) sensor as feedback in a closed-loop control scheme for the fuel-air (FA) ratios for each cylinder. ICFC is unique as a control system as it calculates multiple channels of input information and then has to assign each cylinder to a channel (event delay). This gives the opportunity to change the channel if results show signs of control instability. This allows for greater individual cylinder FA control for a nominal system. It also provides the ability to learn as the engine and sensors age. It allows for better calibration of the oxygen sensor monitors and the cylinder imbalance monitors. In ICFC, high frequency processing is performed on the upstream O2 signal to identify portions of the signal relative to each cylinder. Based on analysis of the respective portions of the upstream O2 signal, multipliers (also referred to as "ICFC multipliers") are determined for each cylinders FA ratio. This could be, for example, a multiplier for a base FA ratio determined for every cylinder based on a driver torque request.

Reducing the cylinder FA ratio imbalance increases the robustness of the catalytic efficiency and emissions control. This drives the need to calibrate ICFC to be more sensitive to small imbalances. This increased sensitivity also increases the risk of positive feedback loops when the ICFC event delays are incorrect. ICFC positive feedback loops can lead to poor emissions control and false failures of the cylinder imbalance diagnostic malfunction or fault. The upstream O2 signal is very susceptible to noise, such as due to exhaust manifold design or leaks or sensor damage, contamination, or aging. Any substantial noise in the upstream O2 sensor could affect its signal-to-noise ratio (SNR) and result in misidentified cylinders (combustion events) and incorrectly increased (or inaccurate) ICFC multipliers. Conventional solutions to this problem include using ICFC control only to compensate for large cylinder-to-cylinder imbalances (e.g., ~10-20% or larger), which is not a full solution, including steady-state control, and not suitable for low emissions, and/or to optimize the upstream O2 sensor mounting location to get a more robust signal response, which could be complex and costly (e.g., requiring redesign or application-specific designs).

Accordingly, improved fuel control systems and methods for an internal combustion engine of a vehicle are presented herein. These systems and methods employ a technique for using the results of the closed-loop control action to evaluate the accuracy of the input signal processing. ICFC uses the high-frequency behavior of the upstream O2 sensor of the engine to model the FA ratio of a cylinder relative to the other cylinders on its exhaust bank. The design of ICFC depends on clear separation between the SNR peaks of each cylinder throughout the engine cycle. The relative cylinder imbalance is then the input to a closed-loop control system. The output of that control is an ICFC multiplier for each cylinder applied to its fuel mass target. The high-frequency information of each cylinder's FA ratio is found at a frequency determined by the engine's speed of rotation. Simple band-pass filtering is not sufficient to isolate cylinder-specific information. Therefore, the O2 sensor signal must be sampled at twice the firing frequency at the combustion events of its exhaust bank. These cyclical samples provide an SNR that is consistent for each cylinder from cycle-to-cycle. Each cylinder for each specific engine speed and load operating point is mapped to the cyclical sample location (event delay) that provides the best SNR.

In short, these techniques provide for evaluating, and correcting, if necessary, the event delay mapping. If the ICFC multiplier is applying a large correction, it is possible to observe its result in comparison to no control at all. If the calculated ICFC multiplier leads to worse cylinder imbalance than a neutral multiplier, the most likely explanation is that the control is based on the wrong input information. As the event delay calibration is sensitive to O2 sensor damage/contamination/aging or simulated error, it is the most suspect part of the signal processing. The presented control techniques provides the criteria for deciding when to deviate from the calibrated event delay and attempt control with the next most likely event delay. Potential benefits of the techniques of the present application include more accurate and robust ICFC control even as the engine and the upstream O2 sensor age, including potentially increased fuel control accuracy (and thus increased fuel efficiency and reduced emissions), thereby reducing costs by not having to replace existing components or add new/additional components. These techniques also provide for utilizing ICFC across the full range of individual cylinder FA imbalances (rather than just large cylinder FA imbalances, such as during transient operation) including steady-state emissions control.

Referring now to FIG. 1, a functional block diagram of a vehicle 100 having an example fuel and emissions control system 104 for an internal combustion engine 108 according to the principles of the present application is illustrated. The vehicle 100 is propulsively powered by a powertrain that includes the engine 108 and, in some implementations, one or more electric motors (not shown). While a conventional engine-only powertrain is illustrated, it will be appreciated that the vehicle 100 could have any suitable powertrain configuration including at least an engine (mild hybrid or belt-driven starter-generator (BSG), series hybrid, parallel hybrid, etc.). The engine 108 draws air into an intake manifold (IM) 112 through an induction system or passage 116 that is selectively regulated by a throttle valve 120. The air in the intake manifold 112 is distributed to a plurality of cylinders 124 and combined with fuel from a fuel system 128 to form FA charges within the cylinders 124. While six cylinders divided into two separate cylinder banks are illustrated, it will be appreciated that the engine 108 could include any suitable number of cylinders divided into two separate cylinder banks (4, 8, 10, 12, etc.).

The fuel system 128 could be any suitable fuel supply system (port fuel injection, direct fuel injection, etc.) configured to supply liquid fuel (gasoline, diesel, etc.) for mixture with air charges to form the FA charges. As will be discussed in greater detail below, the ICFC multipliers are multiplier values (e.g., greater than one) that multiply a base FA ratio (based on a driver torque request) for increased engine efficiency and reduced emissions. The FA charges in the cylinders 124 are compressed by respective pistons (not shown) and the compressed FA mixtures are ignited, such as by spark provided by an ignition or spark system 132. While a spark-ignition (SI) is specifically shown and described herein, it will be appreciated that the engine 108 could utilize other suitable combustion schemes, such as compression ignition. The combustion of the compressed FA charges drives the pistons (not shown), which are connected to and rotatably drive a crankshaft 136 to generate drive torque.

The drive torque is then transferred to a driveline (DL) 140 for vehicle propulsion via a transmission (TR) 144 (e.g., a multi-speed automatic transmission), which could be connected to the crankshaft 136 via a fluid coupling or torque converter (not shown). Exhaust gas resulting from combustion of the FA charges is expelled from the cylinders 124 into an exhaust manifold (EM) 148. The exhaust gas in the exhaust manifold 148 is then passed through an exhaust system or passage 152 that includes an exhaust treatment system (ETS) 156 (e.g., a three-way catalytic converter) for mitigating or eliminating emissions before release into the atmosphere. There are also upstream and downstream O2 sensors 160 and 164, respectively, arranged relative to the ETS 156 and each configured to measure an O2 concentration of the exhaust gas flowing thereby. The upstream O2 sensor 160 is utilized in ICFC as it provides a post-combustion measurement (a single O2 signal) indicative of the quality of combustion of the FA charges (i.e., before treatment by the ETS 156).

A controller 168 is configured to control operation of the vehicle 100 and, more particularly, the engine 108 such that it generates enough drive torque to satisfy a driver torque request. The controller 168 or a separate controller could be configured to control non-engine components such as the transmission 148. The controller 168 receives information from a set of one or more sensors 172, including, but not limited to, speeds, altitude, temperatures, and the like. While shown separately, it will be appreciated that the sensor(s) 172 could include the upstream and downstream O2 sensors 160, 164. The controller 168 could receive the driver torque request from a driver or operator of the vehicle 100 via a driver interface 176, which could include, for example, an accelerator pedal. The driver interface 176 could also include other suitable driver-actuated components for operating the vehicle 100, including, but not limited to, a brake pedal, a steering wheel, and transmission gear selector, and the like. The controller 168 is also configured to perform at least a portion of the techniques of the present application, which will now be described in greater detail with respect to FIGS. 2 and 3A-3F.

Referring now to FIGS. 2 and 3A-3F and with continued reference to FIG. 1, a flow diagram of an example fuel control method 200 for an internal combustion engine of a vehicle according to the principles of the present application is illustrated. FIGS. 3A-3F also illustrate example FA imbalances and ICFC multipliers for passive evaluation failure and pass scenarios and will be referenced periodically. While the vehicle 100 and its components are specifically referenced for illustrative/descriptive purposes, it will be appreciated that the method 200 could be applicable to any suitable internal combustion engine. At 204, the controller 168 determines whether a set of one or more optional preconditions are satisfied. This could include, for example only, the engine 104 being on/running and there being no malfunctions or faults present that would otherwise affect the operation or execution of the method 200. This could also include ICFC closed-loop control being enabled or active. When false, the method 200 ends or returns to 204. When true, the method 200 continues to 208. At 208, the controller 168 begins a passive evaluation of ICFC multipliers.

First, the controller 168 determines whether any of the ICFC multipliers exceed an ICFC multiplier threshold. This ICFC multiplier threshold is a fine threshold value and could be, for example, approximately 1.05 (i.e., +5%). A finer threshold is desirable in order to routinely evaluate the ICFC multipliers such that the fuel/emissions control does not drastically err during engine operation, which can be seen in FIGS. 3A-3B where passive evaluation is not utilized. When false, the method 200 ends or returns to 204 or 208. When true, the method 200 continues to 212. At 212, the controller 168 prepares for a first passive evaluation stage. This includes, for example, increasing a deadband of the upstream O2 sensor 160 and the O2 signal and saving or maintaining the current ICFC multipliers (before subsequent manipulation for the purpose of the passive evaluation). This deadband refers to a signal range through which input can be varied without initiating an observable response. At 216, the controller 168 monitors the cylinder FAs using the O2 signal during the first passive evaluation stage using the current ICFC multipliers. This operation 216, in addition to the subsequently described operations 220-248, can be further illustrated in the plots of FIGS. 3C-3F.

At 220, the controller 168 calculates the cylinder FA imbalances ($IMBAL_1$) during the first passive evaluation stage. This could be, for example, an average standard deviation of cylinder FA imbalances. At 224, the controller 168 resets or restored the deadband to normal and resets the ICFC multipliers (e.g., to equal one). At 228, the controller 168 waits for the passive evaluation delay period. At 232, the controller 168 monitors the cylinder FAs using the O2 signal during the second passive evaluation stage using the reset ICFC multipliers. At 236, the controller 168 calculates the cylinder FA imbalance ($IMBAL_2$) during the second passive evaluation stage. At 240, the controller 168 determines whether the first stage cylinder FA imbalance $IMBAL_1$ is greater than or equal to the second stage cylinder FA imbalance $IMBAL_2$. When false, the method 200 continues to 244 where the controller 168 determines that the passive evaluation passed and the ICFC multipliers are restored or returned to their original/stored values (pre-evaluation) and the method 200 ends or returns to 204. When true, the method 200 continues to 248 where the controller 168 determines that the passive evaluation failed and the ICFC multipliers are reset (e.g., set to one), the passive evaluation delay period is increased, and the passive evaluation process is repeated.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A fuel and emissions control system for an internal combustion engine of a vehicle, the fuel and emissions control system comprising:
- an upstream oxygen (O2) sensor arranged upstream or before an exhaust treatment system of the engine, the upstream O2 sensor being configured to generate an O2 signal indicative of a level of O2 in exhaust gas produced by combustion of fuel/air mixtures within each of a plurality of cylinders of the engine;
- a controller configured to:
  - perform individual cylinder fuel control (ICFC) closed-loop control of the engine including determining an ICFC multiplier for each cylinder of the engine to obtain a plurality of ICFC multipliers, each ICFC multiplier indicating a multiplier for a base fuel/air ratio; and
  - perform a passive evaluation of ICFC multipliers including:
    - determining that a particular ICFC multiplier of the plurality of ICFC multipliers exceeds an ICFC multiplier threshold indicative of an ICFC multiplier that will be passively evaluated at a desired frequency;
    - in response to determining that the particular ICFC multiplier exceeds the ICFC multiplier threshold, determining first and second cylinder fuel-air (FA) imbalances during first and second passive evaluation stages, respectively, separated by a passive evaluation delay period; and
  - based on a comparison between the first and second cylinder FA imbalances, either (i) passing the passive evaluation and maintaining the plurality of ICFC multipliers or (ii) failing the passive evaluation and (a) resetting the plurality of ICFC multipliers and (b) increasing the passive evaluation delay period and repeating the passive evaluation.

2. The fuel and emissions control system of claim 1, wherein the controller is further configured to increase a deadband of the upstream O2 sensor and the O2 signal before calculating the first cylinder FA imbalance during the first passive evaluation stage.

3. The fuel and emissions control system of claim 2, wherein the controller is further configured to calculate the first cylinder FA imbalance as an average standard deviation of cylinder FA imbalances using the plurality of ICFC multipliers.

4. The fuel and emissions control system of claim 3, wherein the controller is further configured to reset the deadband and reset the plurality of ICFC multipliers to one before calculating the second cylinder FA imbalance during the second passive evaluation stage.

5. The fuel and emissions control system of claim 4, wherein the controller is further configured to calculate the second cylinder FA imbalance after the passive evaluation delay period as an average standard deviation of the cylinder FA imbalances using the reset plurality of ICFC multipliers.

6. The fuel and emissions control system of claim 5, wherein the controller is further configured to perform the comparison by determining whether the first cylinder FA imbalance is greater than or equal to the second cylinder FA imbalance.

7. The fuel and emissions control system of claim 6, wherein when the first cylinder FA cylinder imbalance is less than the second cylinder FA imbalance, the controller is configured to determine a pass evaluation and restore the plurality of ICFC multipliers to their previous values.

8. The fuel and emissions control system of claim 6, wherein when the first cylinder FA imbalance is greater than or equal to the second cylinder FA imbalance, the controller is configured to determine a fail evaluation, reset the plurality of ICFC multipliers to one, increment the passive evaluation delay period, and repeat the passive evaluation of the plurality of ICFC multipliers.

9. The fuel and emissions control system of claim 1, wherein the ICFC multiplier threshold is approximately 1.05.

10. The fuel and emissions control system of claim 1, wherein the controller is configured to utilize ICFC across the full range of individual cylinder FA imbalances including steady-state emissions control.

11. A fuel and emissions control method for an internal combustion engine of a vehicle, the fuel and emissions control method comprising:
- providing an upstream oxygen (O2) sensor arranged upstream or before an exhaust treatment system of the engine, the upstream O2 sensor being configured to generate an O2 signal indicative of a level of O2 in exhaust gas produced by combustion of fuel/air mixtures within each of a plurality of cylinders of the engine;

providing a controller configured to perform individual cylinder fuel control (ICFC) closed-loop control of the engine including determining an ICFC multiplier for each cylinder of the engine to obtain a plurality of ICFC multipliers, each ICFC multiplier indicating a multiplier for a base fuel/air ratio; and performing, by the controller, passive evaluation of the plurality of ICFC multipliers including:

determining, by the controller, that a particular ICFC multiplier of the plurality of ICFC multipliers exceeds an ICFC multiplier threshold indicative of a ICFC multiplier that will be evaluated at a desired frequency;

in response to determining that the particular ICFC multiplier exceeds the multiplier threshold, determining, by the controller, first and second cylinder fuel-air (FA) imbalances during first and second passive evaluation stages, respectively, separated by a passive evaluation delay period; and based on a comparison between the first and second cylinder FA imbalances, either (i) passing, by the controller, the passive evaluation and maintaining, by the controller, the plurality of ICFC multipliers or (ii) failing, by the controller, the passive evaluation and (a) resetting, by the controller, the plurality of ICFC multipliers and (b) increasing, by the controller, the passive evaluation delay period and repeating the passive evaluation.

12. The fuel and emissions control method of claim 11, further comprising increasing, by the controller, a deadband of the upstream O2 sensor and the O2 signal before calculating, by the controller, the first cylinder FA imbalance during the first passive evaluation stage.

13. The fuel and emissions control method of claim 12, further comprising calculating, by the controller, the first cylinder FA imbalance as an average standard deviation of cylinder FA imbalances using the plurality of ICFC multipliers.

14. The fuel and emissions control method of claim 13, further comprising resetting, by the controller, the deadband and reset the plurality of ICFC multipliers to one before calculating, by the controller, the second cylinder FA imbalance during the second passive evaluation stage.

15. The fuel and emissions control method of claim 14, further comprising calculating, by the controller, the second cylinder FA imbalance after the passive evaluation delay period as an average standard deviation of the cylinder FA imbalances using the reset plurality of ICFC multipliers.

16. The fuel and emissions control method of claim 15, wherein performing the comparison includes determining, by the controller, whether the first cylinder FA imbalance is greater than or equal to the second cylinder FA imbalance.

17. The fuel and emissions control method of claim 16, further comprising when the first cylinder FA cylinder imbalance is less than the second cylinder FA imbalance, determining, by the controller, a pass evaluation and restoring, by the controller, the plurality of ICFC multipliers to their previous values.

18. The fuel and emissions control method of claim 16, further comprising when the first cylinder FA imbalance is greater than or equal to the second cylinder FA imbalance, determining, by the controller, a fail evaluation, resetting, by the controller, the plurality of ICFC multipliers to one, incrementing, by the controller, the passive evaluation delay, and repeating, by the controller, the passive evaluation of the plurality of ICFC multipliers.

19. The fuel and emissions control method of claim 11, wherein the ICFC multiplier threshold is approximately 1.05.

20. The fuel and emissions control method of claim 11, wherein the controller is configured to utilize ICFC across the full range of individual cylinder FA imbalances including steady-state emissions control.

* * * * *